United States Patent Office 3,733,329
Patented May 15, 1973

3,733,329
PROCESS FOR THE PREPARATION OF 2- AND 3-AZA-CHOLESTANE-DERIVATIVES
Zoltan Tuba and Maria Bor, nee Szabo, Budapest, Hungary, assignors to Richter Gedeon Vegyeszeti Gyar R. T., Budapest, Hungary
No Drawing. Filed June 14, 1971, Ser. No. 152,973
Claims priority, application Hungary, June 18, 1970, 395
Int. Cl. C07d 39/00
U.S. Cl. 260—293.54      7 Claims

ABSTRACT OF THE DISCLOSURE

The invention relates to a process for the preparation of cholestane derivatives with a nitrogen atom in 2 or 3 position, having the general formula

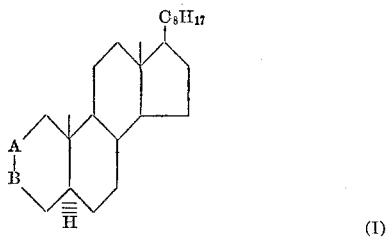

wherein A and B stand for a carbonyl, methylene or imino or N-methylimino group, with the restriction, that within one compound A and B are different, but either A or B stands for an imino or N-methylimino group in each case.

---

The invention relates to a process for the preparation of cholestane derivatives with a nitrogen atom in 2 or 3 position, having the general formula

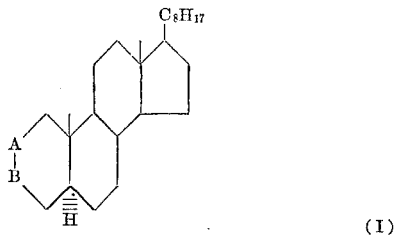

wherein A and B are carbonyl, methylene or imino or N-methylimino group, with the restriction, that within one compound A and B are different, but either A or B stand for an imino or N-methylimino group in each case.

The above compounds have a valuable therapeutical effect, inhibiting the growth of the Gram positive bacterium (*Staphylococcus aureus*), the Gram negative bacterium (*Escherichia coli*), mildew (*Aspergillus niger*) and yeast fungus (*Candida albicans*) (Chem. and Ind. 17, 704, 1967).

The synthesis of 3-aza-5α-cholestane and some of its derivatives has first been published by Shoppe et al. (J. Chem. So. 2275 (1962)). Their process started out from Diels acid and was realized as follows: 3,4-seco-cholest-5-ene-3,4-dicarbonic acid was boiled in acetic acid anhydride for 4 hours, then after distilling off the acetic acid anhydride in vacuo the 4-oxa-A-homo-cholest-5-ene-3,5-dione so obtained was heated with finely divided sodium azide at 140° C. for 40 hours. The product was hydrolysed containing hydrochloric acid ethanol, and the 3-aza-4-oxo-cholest-5-ene so obtained was hydrogenated in acetic acid, in the presence of a platinum catalyst into 3-aza-4-oxo-5α-cholestane. The basic 3-aza-5α-cholestane was obtained by reduction of the above lactam with lithium aluminum hydride.

Another method for the preparation of the latter compound by these authors was based on Diels-acid semi-ester, which was converted with thionylchloride into a semiester-acid chloride, then with ammonium into the semiester-amide of the above compound. By the Hofmann decomposition of this compound, the 2,4-seco-2-carbamoyl-4-carbomethoxy-A-nor-cholest-5-ene the 3 - aza-4-oxo-cholest-5-ene was obtained, the latter being reduced to yield 3-aza-5α-cholestane.

The synthesis of 2-oxo-3-aza-5α-cholestane and of 3-oxo-2-aza-5α-cholestane was realized in a theoretically different manner by Doorenbos and Havranek (J. Org. Chem. 30, 2474 (1965)). 3-oxo-A-nor-5-α-cholestane-3-oxime was subjected to a Beckmann rearrangement. The 2-oxo-3-aza-5α-cholestane obtained by the reaction, i.e. the 1:1 mixture with 3-oxo-2-aza-5α-cholestane could only be separated over the N-methyl derivative.

Jones et al. described in 1939 a more recent and up-to-date method (J. Chem. Soc. 1597, (1969)), according to which 2,3-seco-5α-cholestane-2,3-dicarbonic acid was converted in dioxane with dicyclohexylcarbodiimide in a known way to 2,4 - dioxo-3-oxa-5α-A-homo-cholestane, then opened with ammonium, in anhydrous toluene into the 4-carbamoyl-2,4-seco-5α-A-nor-cholestane-2-carbonic acid. The compound was esterified with diazomethane, then subjected to Hofmann decomposition with an alkaline bromine solution, whereby 2-oxo-3-aza-5α-cholestane was obtained.

From among the described processes the Shoppee Diels acid synthesis can be realized with very low yields only mainly on account of the difficulty of preparing 3,4-seco-5α-chlorestane-3,4-dicarbonic acid.

With the Doorenbos method a 1:1 mixture of 2-oxo-3-aza and 2-aza-3-oxo-5α-cholestane can be prepared, which can only be separated by means of the alkylated of halogenated derivatives.

While the Jones et al. synthesis is an up-to-date method, yet it is difficult to carry out in its closing step, since the Hofmann decomposition involves various side reactions owing to the oxydative effect of sodium hypobromite or sodium hypochlorite.

In the course of our experiments directed at eliminating the disadvantages of the prior art methods we have arrived at the unexpected result that if lead tetraacetate is employed for the decomposition of the known 2-3-seco-5α-cholestane of the general formula

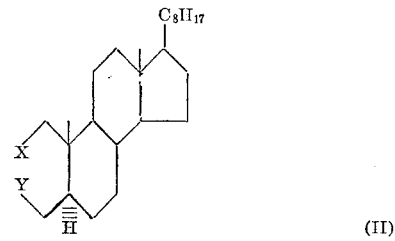

wherein X and Y stand for a carbamoyl and/or carbomethoxy, or carbomethoxy group, but X is different from Y for the same compound-, the synthesis of 2-oxo-3-aza-5α-cholestane derivatives or 3-oxo-2-aza - 5α - cholestane derivatives of the general Formula I may be realized in a simple way, free from side-reactions, with an almost quantitative yield.

The process is realized more particularly in the following manner, working in accordance with the invention:

A compound of the general Formula II, e.g. 4-carbamoyl 2,4-seco-5α-cholestane-2-carbonic acid methylester (prepared as described in J. Chem. Soc. 1957 (1969)), or 1-carbamoyl-1,3-seco-5α-cholestane-3-carbonic acid-methylester, obtained as described in the following examples, by the alkaline splitting up of the A-ring of 2,4-dioxo-3-aza-5α-A-homocholestane, and subsequent esterification of the formed 1-carbamoyl-1,3-seco-5α-cholestane-3-carbonic acid, is dissolved in an alcohol or an aromatic hydrocarbon, preferably in methanol or benzene, and lead tetraacetate fresh from the filter is added to the solution. The reaction mixture is boiled for about 30 minutes. After distilling the solvent off, the residue is rubbed with ether or tetrahydrofurane, the non-dissolving lead salt is filtered out and thoroughly washed. After distilling the solvent off from the filtrate, the methylurethane derivative formed from the isocyanate residue on the effect of the methanol as solvent is closed into a ring, either directly or after isolation and purification, proceeding in the following manner: The methyl urethane derivative is dissolved in an alcohol, preferably in methanol, whereafter an alkali metal hydroxide solution or an alkali metal alcoholate is added to the reaction mixture. After heating for about 30 minutes the pH of the solution is adjusted to 7, the solvent is distilled off, the residue rubbed with water, filtered, and washed. After drying the product is recrystallized, if necessary, thereafter the 2-aza-3-oxo-5α-cholestane or 2-oxo-3-aza-5α-cholestane obtained is reduced with a complex metal hydride, preferably with sodium-bis-(2-methoxy-ethoxy)-aluminum hydride into a basic 2-aza-5α-cholestane or 3-aza-5α-cholestane derivative. The lactams are dissolved in a polar solvent—preferably in tetrahydrofurane, dioxane or benzene—and after adding the reducing agent the reaction mixture is boiled in a nitrogen-stream. After decomposing the excess reducing agent in a known way the isolated 2- or 3-aza-5α-cholestane may be further processed, if desired, for example by dissolving in formic acid, and then adding a formaldehyde solution. After boiling for some hours and hydrolysis with an alcoholic alkali hydroxide solution the N-methyl-derivatives are isolated.

These N-methyl-derivatives may also be obtained by reversing the order of the reaction in the following manner: The lactams obtained in the course of the lead tetraacetate decomposition, the 2-aza-3-oxo, or 3-aza-2-oxo-5α-cholestane is methylated in the presence of a potassium-tertiary-butylate with methyl iodide, then it is reduced with sodium-bis-(2-methoxy-ethoxy)aluminum hydride into the basic- N-methyl-derivative.

Decomposition and ring closure take place in accordance with the following reaction scheme: Lead tetraacetate reacts with the carbamoyl group and converts the latter into an isocyanato group. The isocyanato group is transformed in an alcoholic medium into a carbalkoxy--amino-group, on the effect of the alcohol present in the mixture. This urethane derivative is hydrolysed in an alkaline medium into an amine derivative, then, on the effect of the favorable spatial arrangement it forms a lactam ring with the amine and carbalkoxy groups.

The process according to the invention is described more particularly in the following examples.

EXAMPLE 1

Preparation of N-methyl-3-aza-5α-cholestane (a) Preparation of 4-carbomethoxy-amino-2,4-seco-5α-cholestane-2-carbonic acid-methylester.—8 grams of 4-carbamoyl-2,4-seco-5-α-cholestane-2-carbonic acid methylester are dissolved in 400 mls. of methanol, whereafter 70 grams of lead tetraacetate fresh from the filter are added. The reaction mixture is kept boiling in a nitrogen atmosphere for 30 minutes with stirring, then the solvent is distilled off in vacuo. The residue is treated with ether, and the undissolved lead salt is filtered off. The filtrate is washed to neutrality, then condensed. The 4-carbomethoxyamino-2,4-seco-5α-cholestane-2-carbonic acid methylester so obtained is crystallized from mehtanol. 8 grams (87%) of the product are obtained, with a melting point of 83-85° C.

Analysis.—Calculated (percent): C, 72.91; H, 10.76; N, 2.93. Found (percent): C, 72.68; H, 11.00; N, 3.11.

(a/1) Preparation of 4 - isocyanate - 2,4-seco-5α-cholestane-2-carbonic acid methylester.—4 grams of 4-carbamoyl-2,4-seco-5α-cholestane - 2 - carbonic acid methylester are dissolved 250 mls. of benzene. 35 grams of lead tetraacetate wet from the filter are added. The reaction mixture is kept boiling in a nitrogen atmosphere for about 90 minutes with stirring, the solvent is distilled off in vacuo. The residue is treated with ether, and the undissolved lead salt is filtered off. The filtrate is washed to neutral with a dilute 2% cold sodium hydrocarbonate solution and condensed. The 4-iso-cyanato-2,4-seco-5α-cholestane-2-carbonic acid methylester so obtained is an oily product, weighing 3.4 grams. One proceeds as described in Example (1/b), thus obtaining 2 grams (66%) of 3-aza-2-oxo-5α-cholestane. Melting point:217–219° C., crystallized from acetone.

(b) Preparation of 3-aza - 2 - oxo-5α-cholestane.—8 grams of 4-carbomethoxyamino-2,4-seco-5α-cholestane-2-carbonic acid-methylester are dissolved in 200 mls. of methanol, then 16 mls. of a 18% sodium methylate solution are added. The mixture is kept boiling from some 30 minutes in a nitrogen atmosphere, and the methanol is then distilled off in vacuo.

To the residue of distillation water is added, and the pH of the solution is adjusted to 2 with hydrochloric acid. The precipitate is filtered, washed to neutrality and dried. 5.7 grams (94.5%) of 3-aza-2-oxo-5α-cholestane are obtained. M.P. 217–219° C., after recrystallization from acetone.

Analysis.—Calculated (percent): C, 80.56; H, 11.70; N, 3.61. Found (percent): C, 80.72; H, 11.57; N, 3.71.

(c) Preparation of 3-aza-5α-cholestane.—3 grams of 3-aza-2-oxo-5α-cholestane are dissolved in 300 mls. of anhydrous dioxane, then 3 grams of lithium-aluminium hydride are added with introduction of nitrogen gas, and vigorous stirring. The reaction mixture is kept boiling for about 5 hours, then the excess reducing agent is decomposed with water in a nitrogen stream at 10° C. The precipitated lithium and aluminium hydroxide is filtered and washed. The filtrate is evaporated to dryness, the residue taken up in anhydrous ether and the hydrochloride of 3-aza-5α-cholestane is separated with anhydrous hydrochloric acidic ether. 2.6 grams (90%) of the product are obtained. M.P. after recrystallization from acetone: 282–285° C.

Analysis.—Calculated (percent): C, 83.57; H, 12.68; N, 3.75. Found (percent): C, 83.50; H, 12.79; N, 3.82.

(d) Preparation of N-methyl-3-aza-5α-cholestane.—10 grams of 3-aza-5α-cholestane are dissolved in the mixture of 100 mls. of 98% formic acid and 70 mls. of 36% aqueous formaldehyde, then kept boiling for 2 hours in a nitrogen atmosphere, 80 mls. of formaldehyde are added to the reaction mixture, and boiling is continued for a further 3 hours. The reaction mixture is evaporated to dryness, 400 mls. of 10% methanolic potassium hydroxide are added to the residue, and the mixture is kept boiling for 20 minutes in a nitrogen atmosphere. The solvent is distilled off the reaction mixture. Water is added to the residue, followed by extraction with chloroform. The chloroform phase is washed with water, dried, then evaporated to dryness. One obtains 7 grams (67.5%) of N-methyl-3-aza-5α-cholestane. M.P. 89–90° C.

Analysis.—Calculated (percent): C, 83.64; H, 12.74; N, 3.61. Found (percent): C, 83.52; H, 12.85; N, 3.71.

(e) Preparation of N-methyl - 3 - aza-2-oxo-5α-cholestane.—6 grams of 3-aza-2-oxo-5α-cholestane are dissolved in a mixture containing 80 mls. of 6.2% potassium tertiary butylate and 80 mls. of butanol, whereafter 15 mls. of methyl iodide are added to the solution. The reaction mixture is kept for 1 hour at a temperature ranging from 40 to 45° C., then the pH of the solution is adjusted to neutral with a 10% hydrochloride acid solution. After evaporation of the t-butanol in vacuo the residue is thoroughly rubbed with water, then extracted with 3× 50 mls.

of chloroform. The extracts are combined, and washed thoroughly with water, dried over sodium sulphate, and the solvent is evaporated. The residue is rubbed with ether whereupon 5.6 grams (98%) of N-methyl-3-aza-2-oxo-5α-cholestane are obtained. M.P. 138–139° C.

(f) Preparation of N-methyl-3-aza-5α-cholestane.—5.6 grams of N-methyl-3-aza-2-oxo-5α-cholestane are dissolved in 150 mls. of toluene, and 15 mls. of 70% sodium-bis-(2-methoxy-ethoxy)-aluminum hydride are added to the solution. The reaction mixture is kept boiling for 1 hour in an $N_2$ atmosphere. The excess reducing agent is then decomposed with 20 ml. of water, with icy water cooling. After separation of the organic and aqueous phases the toluene solution is stirred with a neutral aluminium oxide (activity: 4), then the aluminium oxide is filtered out. The toluene solution is extracted with a 10% solution of hydrochloric acid. After combining the acidic solutions the steroid base, the N-methyl-3-aza-5α-cholestane is precipitated with a 10% sodium hydroxide solution. The precipitate is filtered, washed thoroughly with water, dried. The product is recrystallized from acetonitrile. 5 grams of N - methyl - 3 - aza - 5α - cholestane (92.5%) are obtained. M.P. 89–90° C.

EXAMPLE 2

Preparation of N-methyl-2-aza-5α-cholestane (a) Preparation of 2,4-dioxo-3-aza-5α-4-homocholestane.—20.8 grams of 4-carbamoyl-2,4-seco-5α-cholestane-2-carbonic acid methylester are dissolved with heating in 624 mls. of methanol, whereafter 83.2 mls. of 20% sodium methylate solution are added. The solution is kept boiling for a couple of minutes with reflux cooling, then the methanol is distilled off. The residue is dried at 70° C., then suspended in 500 mls. of water. The pH of the suspension is adjusted with hydrochloric acid to 2. After allowing the suspension to stand for a few hours—during which time the precipitate is condensed—the 2,4-dioxo-3-aza-5α-4-homo-cholestane is filtered, washed to neutrality, and dried. 18 grams (92.4%) of the product are obtained. M.P. 232–234° C. (after recrystallization from methanol).

Analysis.—Calculated (percent): C, 78.02; H, 10.91; N, 3.37. Found (percent): C, 78.00; H, 11.03; N, 3.41.

(b) Preparation of 1 - carbamoyl-1,3-seco-5α-A-norcholestane-3-carbonic acid.—13 grams of 2,4 - dioxo-3-aza-5α-A-homocholestane are dissolved in a mixture of 975 mls. of ethanol and 120 mls. of water, whereafter 195 mls. of a 2% sodium hydroxide solution are added. The reaction mixture is kept boiling for 15 minutes. The solution is then distilled in vacuo to ⅓ of its original volume. The distillation residue is diluted with 1000 mls. of water, the pH of the solution is adjusted with hydrochloric acid to 2, the precipitated substance is filtered, washed to neutrality and dried. 12 grams (89%) of 1-carbamoyl-1,3-seco - 5α - A-norcholestane-3-carbonic acid are obtained. M.P. 212–215° C. The crude product is employed for the following step without purification.

(c) Preparation of 1 - carbamoyl - 1,3-seco-5α-A-norcholestane-3-carbonic acid-methyl ester.—13.4 grams of 1-carbamoyl-1,3-seco-5α-A-norcholestane-3-carbonic acid are suspended in a mixture of 200 mls. of ether and 6 mls. of methanol, whereafter a solution of diazomethane in ether is added dropwise to the above mixture as long as the diazomethane keeps its yellow colour, and the starting substance is dissolved. After distilling off the solvent the residue is rubbed with N-hexane. 12.5 grams (92.5%) of 1 - carbamoyl-1,3-seco-5α-A-norcholestane-3-carbonic acid methylester are obtained, with a melting point of 144–146° C. (after recrystallization in methanol).

Analysis.—Calculated (percent): C, 75.12; H, 11.05; N, 3.13. Found (percent): C, 75.21; H, 11.00; N, 3.19.

(d) Preparation of 1 - carbomethoxyamino-1,3-seco-5α-A-norcholestane-3-carbonic acid methylester.—One proceeds as described in Example 1 under (a) with the difference of starting out from 8 grams of 1-carbamoyl-1,3-seco-5α-A-norcholestane-3-carbonic acid methylester. 8 grams (87%) of 1-carbomethoxyamino-1,3-seco-5α-A-norcholestane-3-carbonic acid methylester are obtained with a melting point of 120–122° C.

Analysis.—Calculated (percent): C, 72.91; H, 10.76; N, 2.93. Found (percent): C, 72.85; H, 10.97; N, 3.05.

(e) Preparation of 2 - aza-3-oxo-5α-cholestane.—One proceeds as in Example 1, variant (b), with the difference of using 8 grams of 1-carbomethoxy-amino-1,3-seco-5α-A-norcholestane-3-carbonic acid methylester as starting substance. 5.9 grams (97.7%) of 2-aza-3-oxo-5α-cholestane are obtained. M.P. 235–237° C.

Analysis.—Calculated (percent): C, 80.56; H, 11.70; N, 3.61. Found (percent): C, 80.42; H, 11.87; N, 3.73.

(f) Preparation of 2-aza-5α-cholestane.—One proceeds as described in Example 1, variant (c), with the difference of using as starting material 1.26 grams of 2-aza-3-oxo-5α-cholestane. 1.1 gram (93%) of 2-aza-5α-cholestane are obtained. M.P. 85–87° C. after recrystallization from acetone. The 2-aza-5α-chlestane hydrochloride is decomposed at 265–267° C., after recrystallization from methanol.

Analysis.—Calculated (percent): C, 76.89; H, 11.38; N, 8.45. Found (percent): C, 76.60; H, 11.51; N, 8.39.

(g./1) Preparation of N-methyl-2-aza-5α-cholestane.—Starting out from 10 grams of 2-aza-5α-cholestane, one works as described in Example 1, one obtains 6.7 grams (65.5%) of N-methyl-2-aza-5α-cholestane, with a melting point of 73–74° C.

Analysis.—Calculated (percent): C, 83.64; H, 12.74; N, 3.61. Found (percent): C, 83.75; H, 12.80; N, 3.65.

(g./2) Preparation of 2-methyl-2-aza-5α-cholestane.—One proceeds as described in Example 1, variant (c), starting out from 5.5 grams of N-methyl-2-aza-3-oxo-5α-cholestane, obtaining 5 grams (94.5%) of N-methyl-2-aza-5α-cholestane. M.P. 73–74° C.

Analysis.—Calculated (percent): C, 83.64; H, 12.74; N, 3.61. Found (percent): C, 83.72; H, 12.81; N, 3.55.

(h) Preparation of N - methyl-2-aza-3-oxo-5α-cholestane.—6 grams of 2-aza-3-oxo-5α-cholestane are reacted as described in variant (e) of Example 1. One obtains 5.5 grams of N-methyl-2-aza-3-oxo-5α-cholestane. M.P. 126–217° C.

Analysis.—Calculated (percent): C, 80.73; H, 11.80; N, 3.49. Found (percent): C, 81.00; H, 11.76; N, 3.57.

What we claim is:

1. A process for the preparation of a cholestane derivative and its salts containing a nitrogen atom in 2 or 3 position, of the formula

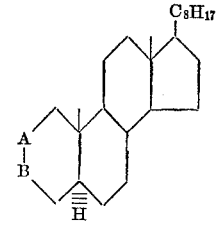

wherein A and B are carbonyl-, methylene, imino-, or N-methylimino such that within the same compound A and B are different but either A or B always stands for an imino-, or N-methylimino group, comprising the steps of:

(a) reacting a compound of the formula

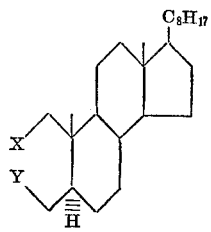

wherein X and Y stand for a carbamoyl- and/or carbomethoxy-, or carbethoxy-group, but in one compound X and X are different, with lead tetraacetate under a nitrogen atmosphere at the boiling point of the reaction mixtures; and (b) subjecting the reaction product to ring closure in the presence of an alkali metal hydroxide or an alkali metal alcoholate at the boiling point of the reaction mixture and under a nitrogen atmosphere.

2. The process defined in claim 1 wherein the reaction product of step (b) is a lactam, further comprising the step of subjecting said lactam to methylation with methyl iodide in the presence of potassium-tertiary-butylate.

3. The process defined in claim 2 further comprising the step of reducing the methylated lactam with sodium-bis-(2-methoxyethoxy)-aluminum hydride.

4. The process defined in claim 1 wherein the reaction product of step (b) is lactam, further comprising the steps of subjecting the lactam to reduction with a complex metal hydride, and to subsequent methylation with formaldehyde in a formic acid medium.

5. The process defined in claim 1 wherein the reactions are carried out in an alcoholic or aromatic hydrocarbon medium.

6. The process defined in claim 5 wherein the reactions are carried out in methanol or benzene.

7. The process defined in claim 1 wherein the ring closure step is carried out in the presence of sodium hydroxide or sodium alcoholate solution.

References Cited

Jones et al., J. Chem. Soc. 1969 1597–1602.
Kochi, J. Am. Chem. Soc. 87 (8), 1811–2 (1965).

HENRY R. JILES, Primary Examiner
G. T. TODD, Assistant Examiner

U.S. Cl. X.R.
260—999